United States Patent [19]

Stumpf et al.

[11] 3,963,460

[45] June 15, 1976

[54] METHOD AND APPARATUS FOR TREATING WASTE GASES CONTAINING RADIOACTIVE IMPURITIES, PARTICULARLY KRYPTON AND XENON NUCLIDES

[75] Inventors: Willy Stumpf, Oberstedten; Horst Queiser, Hochstadt; Harald Jüntgen, Essen; Hans-Jürgen Schröter, Essen; Karl Knoblauch, Essen, all of Germany

[73] Assignees: Licentia Patent-Verwaltungs-G.m.b.H., Frankfurt am Main; Bergwerksverband GmbH, Essen-Kray, both of Germany

[22] Filed: Apr. 4, 1976

[21] Appl. No.: 458,033

[30] Foreign Application Priority Data
Apr. 4, 1973  Germany............................ 2316831

[52] U.S. Cl........................................ 55/66; 176/37
[51] Int. Cl.²......................................... B01D 53/04
[58] Field of Search............... 55/66, 74, 76, 59, 62, 55/179; 176/37

[56] References Cited
UNITED STATES PATENTS

| | | | |
|---|---|---|---|
| 3,501,923 | 3/1970 | Lehmer.............................. | 55/74 X |
| 3,791,107 | 2/1974 | Gustavsson....................... | 55/179 |
| 3,803,802 | 4/1974 | Schröter et al..................... | 55/66 |
| 3,871,841 | 3/1075 | Queiser et al..................... | 55/66 X |
| 3,871,842 | 3/1975 | Queiser et al..................... | 55/66 X |

Primary Examiner—John Adee
Assistant Examiner—Ethel R. Cross
Attorney, Agent, or Firm—Spencer & Kaye

[57] ABSTRACT

A method for treating waste gases containing radioactive contamination, particularly krypton and xenon nuclides. The waste gas stream to be decontaminated is initially conducted through an enrichment system wherein the waste gas stream is divided into at least two partial streams one of which is substantially free from the radioactive impurities and constitutes the poor gas fraction and another of which constitutes the rich gas fraction. The poor gas fraction is discharged, at least in part into the atmosphere while the rich gas fraction is fed into an activated carbon delay path whose output is discharged, either directly or indirectly into the atmosphere. Apparatus for carrying out the method is also disclosed.

20 Claims, 7 Drawing Figures

METHOD AND APPARATUS FOR TREATING WASTE GASES CONTAINING RADIOACTIVE IMPURITIES, PARTICULARLY KRYPTON AND XENON NUCLIDES

BACKGROUND OF THE INVENTION

During the operation of nuclear systems, particularly nuclear power plants, radioactive waste gases develop which contain, inter alia, krypton and xenon nuclides. These radioactive waste gases must not be discharged into the atmosphere at will since the regulating authorities require the observance of maximum permissible values of radioactivity. The discharge of these gases into the atmosphere must thus be delayed for a period of time sufficient for the radioactivity to drop to a value below the maximum permissible values.

It is known (for example "Kerntechnik" 13 (1971) page 205 and Ind. Eng. Chem. 51 (1959) page 1467) that these requirements can be met if the waste gas which is contaminated with radioactive noble gases is conducted over activated carbon delay paths where the noble gases remain substantially longer than the inactive carrier gas, for example, air, because of the adsorptive forces of the activated carbon. Such delay systems generally operate at temperatures around 20°C and at pressures of about or slightly less than 1 atmosphere absolute.

It has been found, however, that the long-lived radionuclides, particularly $Kr^{85}$ with a half-life of 10.7 years, are decomposed only insignificantly by such a delay. The danger thus exists that with an increase in the number of nuclear systems the concentration of $Kr^{85}$ in the atmosphere will continuously increase.

For this reason processes have been developed in which the radioactive noble gases krypton and xenon are separated from the exhaust or waste gas mixture and are stored in a highly concentrated form in a radiation-proof manner. A number of such processes which will be called separating or enrichment processes hereinafter are known.

Thus, for example, it is known that the radioactive noble gases may be separated from the waste gases from nuclear power plants and fuel element processing plants by liquefaction and fractionated distillation of the waste gases. Furthermore, processes are known in which the noble gases are separated from the waste gases by absorption in solvents or by the use of permselective membranes. Finally, processes have been proposed in which the noble gases — particularly the long-lived $Kr^{85}$ — are separated from the waste gases adsorptively, preferably by way of adsorption on activated carbon and are stored in a radiation-proof manner. Generally the adsorbers are operated at low temperatures (−40° to −195°C), which makes them expensive to maintain. For regeneration purposes, the charged activated carbon is either evacuated (BNL Report No. 689 (T-235), Brookmeade National Laboratory, September 1960), or an inert rinsing gas, preferably helium is conducted through the adsorption/desorption reactors (Industrial Chemist 39, (1963) page 358). In the former cases it is necessary, however, to increase the temperature to higher than +100°C in order to achieve complete desorption of the noble gases. In the latter case the rinsing gas containing the desorbed fission gas components krypton and xenon can be conducted through a further, larger activated carbon column where krypton and xenon are separated from one another as in a gas chromatograph. This however produces an additional dilution by the carrier gas (helium), which must be removed from the desorption gas fraction containing the krypton and xenon in a further low temperature adsorber.

German Patent Application P 2210264 filed 3. 3. 1972, the contents of which are incorporated by reference, discloses a further process for separating and recovering mostly radioactive krypton and xenon nuclides from waste gases containing such nuclides, in which an adsorption of krypton and xenon to activated carbon is effected in a reactor until there is a krypton breakthrough at the output end of the reactor and thereafter the adsorption medium is regenerated in three stages. A great advantage of this process compared to the above-mentioned methods is that a special combination of pressure reduction and use of rinsing gas eliminates the need for low temperatures and temperature changes to produce sufficient enrichment factors. The rinsing gases may be, for example, air, nitrogen or helium. $CO_2$ or other gases which can easily be condensed out are suitable as rinsing media at normal or not very low temperatures (to about −20°C). A further significant advantage compared to the prior methods is finally that a separation of the krypton nuclides from the xenon nuclides can be effected during the regeneration of the adsorber, i.e. in the same operating step and without the use of an additional chromatographically operating activated carbon vessel. The method according to the above mentioned patent application will be explained in further detail in the description of the drawing figures since it can be used with advantage in connection with the present invention.

All of the separating or enrichment processes discussed above have not been able to gain major significance in practice and, in particular, the safe storage of concentrated radioactive gases raises great difficulties. Additionally, the regulating authorities have thus far not required that the long-lived $Kr^{85}$ be quantitatively separated from the waste gases of the nuclear power plants. Thus activated carbon delay paths or columns are usually employed in practice.

The known activated carbon delay paths must be designed at the present time so that delay times of about two to three days for krypton and of about 30 to 50 days for xenon are achieved. The quantities of activated carbon required for this purpose usually amount to more than $100m^3$ for the usual gas quantities at normal operating pressures and temperatures.

Since the discharge conditions for radioactive substances into the environment will be more strict in the future, this would involve an even further increase in the capacities of the activated carbon systems which should be avoided for reasons of safety and costs, since the costs for enclosed space in nuclear power plants are very high due to the radiation protection measures involved. At present such costs amount to about 250 German marks per $m^3$ of such enclosed space.

In principle, the possibilities for decreasing the delay systems are either to cool the delay path or to increase the operating pressure in the delay system. In the former case, the expenses involved for the cooling systems required for this purpose, are substantially greater than the savings due to reduction of structural volume. Regarding the possibility of increasing the operating pressure, this produces special problems regarding the tight sealing and safety of such systems which also requires considerable expense.

SUMMARY OF THE INVENTION

It is therefore the object of the present invention to improve the known methods for treatment of waste gases containing radioactive impurities, particularly krypton and xenon nuclides, by adsorption in an activated carbon delay path, so that the size of the delay path will be as small as possible without producing the drawbacks mentioned above in connection with a decrease in the size of the delay systems.

This is accomplished according to the present invention in that instead of feeding the stream of contaminated waste gas directly to the activated carbon delay path, the stream of waste gas which is to be decontaminated is conducted initially into an enrichment system where the waste gas stream is divided or separated into at least two partial streams, one of which, i.e. the poor gas fraction, is substantially free of radioactive impurities and is then conducted at least in part into the atmosphere. Only the partial stream containing the radioactive gas, i.e. the rich gas fraction, is then conducted over the activated carbon delay path.

The present invention is thus based on the idea that the activated carbon volume required to delay the noble gases can be reduced in that the size of the stream is reduced without the requirement for storing radioactive products or emitting additional radioactivity into the environment. It is known that the delay or retention times of activated carbon delay paths or columns are calculated according to the following equation:

$$t_R = \frac{R \cdot V}{w}$$

where $t_R$ is the delay time in hours, $V$ is the bulk volume of activated carbon in m$^3$, $w$ is the quantity of gas put through the system in m$^3$, per hour, and $R$ is the retention factor. The retention factor $R$, which depends on the type of activated carbon employed, the type of gas involved (krypton, xenon, carrier gas) and the pressure and temperature in the delay path, is determined in laboratory experiments. It can be seen from the equation that the delay time is inversely proportional to the gas throughput.

The method of the present invention is practiced with particular advantage when in the enrichment system the stream of waste gas is introduced into a first adsorption/desorption reactor which is filled with activated carbon and flows therethrough until the first active component breaks through at the output of the reactor in unpermissible concentration, the gas having been discharged to this point representing the poor gas fraction. After the breakthrough, the waste gas stream is disconnected from the first reactor and introduced into a similar further adsorption/desorption reactor. The first adsorption/desorption reactor is then regenerated by initially pumping out the first reactor and returning the pumped out gas fraction to the stream of waste gas and thereafter rinsing the first reactor with an inactive rinsing gas flowing in countercurrent through the first reactor and at subatmospheric pressure with or without an increase in temperature up to a maximum of 150°C. The then extracted gas fraction is conducted, as the rich gas fraction, either through further enrichment stages or directly under the same or only slightly higher pressure into the delay path. Thereafter the adsorption/desorption reactor is brought back to normal pressure by the introduction of an inactive gas to the first reactor.

The gas which is conducted through the activated carbon delay path is produced in the series-connected enrichment stage during the regeneration step while the rinsing process is taking place. Air at pressure below 760 Torr, preferably between 30 and 150 Torr, generally is employed for the rinsing step. Advisably the subsequently connected activated carbon delay path is then operated at approximately the same subatmospheric pressure, at least not much higher than atmospheric pressure, in order to avoid any additional costs for the energy required for operating a pump or a compressor.

It is sometimes necessary to modify the present invention so that the first gas fraction, i.e., the poor gas fraction, which is free from noble gases is not conducted directly from the enrichment stage, i.e., the adsorption/desorption reactor, into the atmosphere. This is applicable particularly when, in addition to the noble fission gases, additional radioactive activation gases, particularly nitrogen and oxygen nuclides, are contained in the exhaust air. In this case, at least a portion of the first gas fraction can be stored in an intermediate vessel and, during the regeneration of the enrichment stage, can be used for rinsing and for pressure equalization. Thus a small portion of this gas with its possible radioactive nitrogen and oxygen nuclides will also reach the delay path and will enter the atmosphere substantially later.

A particularly large reduction in the waste gas quantity and thus a large decrease in the size of the delay path is realized if the rinsing gas in the enrichment stage is an easily condensible gas such as for example, water vapor, $CO_2$, $NH_3$ or freon, instead of air, and this condensible gas is condensed out of the rich gas fraction before it enters the acitvated carbon delay path.

The concentration of noble gases in the rinsing gas fraction removed from the enrichment stage is a multiple more than the starting concentration in the waste gas stream, with the concentration depending on the type of process employed. With one enrichment stage operating at normal temperature, enrichment factors of more than 3 can be attained using air as the rinsing gas and enrichment factors of more than 15 can be attained using an easily condensible gas as the rinsing gas. It has been found, however, that these increased concentrations do not impede the efficiency of the subsequently connected delay path.

The decontaminated waste gas at the output of the delay path is further diluted, before entering the chimney, by mixing it with the gas fraction free from noble gases (poor gas fraction) coming from the enrichment stage. Intensive mixing is generally required because the concentration of fission and activation gases released from the enrichment stage during the rinsing process are not constant and the fluctuations will also not be completely equalized in the subsequent delay path.

A further embodiment of the present invention provides that in the enrichment stage not only is the waste gas stream which is to be decontaminated reduced in size but, as described in the above identified patent application, the noble gases krypton and xenon are separated from one another. Such a process is particularly advantageous if only the xenon with its relatively short-lived radionuclides is subsequently conducted through the delay path while the krypton, which partly consists of the long-lived $Kr^{85}$, is further concentrated in further enrichment stages so that the concentrated krypton can be stored in longterm storage facilities.

Sometimes it is also advantageous, if the rinsing process during the regeneration in the enrichment stage is divided, if a first portion of the rinsing gas fraction which is particularly rich in krypton and xenon is extracted and conducted through the delay path, and a second portion of the rinsing gas fraction, whose krypton and xenon concentration corresponds on the average to the starting concentration of the waste gas, is returned to the contaminated waste gas. It has been found that the quantity of rinsing gas which reaches the delay path is thus reduced considerably once more - at normal temperature, for example, to approximately one half - so that the subsequent delay path is also reduced in length to the same extent. Such a divided rinsing cycle also offers the possibility that in its first part the rinsing may even be effected with contaminated waste gas and this is conducted through the delay line, while in the second part the rinsing is effected with air or some other inactive gas in order to completely desorb the noble gases and this fraction is returned to the contaminated waste gas.

The advantages realized with the present invention are particularly that the method brings about a substantial reduction in the size of the plant since the delay path can be made substantially smaller than would be possible without an enrichment stage since the quantity of waste gas supplied to the delay path has been greatly reduced. The "reduction factor" lies in a range of about 0.1 to 0.7 depending on the type of process employed and the reduction in size of the plant is not realized at the expense of increased discharge of radioactivity to the atmosphere or by the necessity of having to store radioactive gases for long periods of time.

In addition, the process according to the present invention constitutes a favorable intermediate solution between the previously satisfactory delaying process and the separating process, and can be adapted to the increasing demands regarding minimum radioactivity discharges by, for example connecting a plurality of enrichment stages ahead of the delay path or by separating and storing only the krypton but not the xenon. This permits a step-wise transition in the direction toward the so-called "zero release".

Further advantages of the process according to the present invention are that no high pressures and generally no temperature changes are required. The following description of the invention and the examples show that even at normal pressures and temperatures a substantial reduction in the size of the system is achieved. The size of the enrichment stage substantially depends on how much time is required for the regeneration step, particularly the rinsing cycle. The regeneration time determines the size and number of the alternatingly operated adsorption/desorption reactors in the enrichment stage. Generally two or three adsorption/desorption reactors will be sufficient. The quantity of the rinsing gas required for the regeneration process then determines the size of the subsequently connected delay path. Sometimes it may be favorable to increase the temperature in the adsorption/desorption reactor to a maximum of about 150°C during the regeneration process in the enrichment stage so that the quantity of rinsing gas and the rinsing time can be reduced. For example, it would be possible to directly introduce hot air as the rinsing gas and conduct it through the reactors.

The adsorption medium best suited for use in both the reactors and in the delay path is activated carbon which has been found to be better with respect to the noble gas adsorption than the zeolithic molecular filters (see, for example, Ind. Eng. Chem. 51 (1959) 1467 and the above mentioned BNL report No. 689 (T-234) Sept. 1960).

DETAILED DESCRIPTION OF THE PREFERRED EMBODIMENTS

Figure 1:
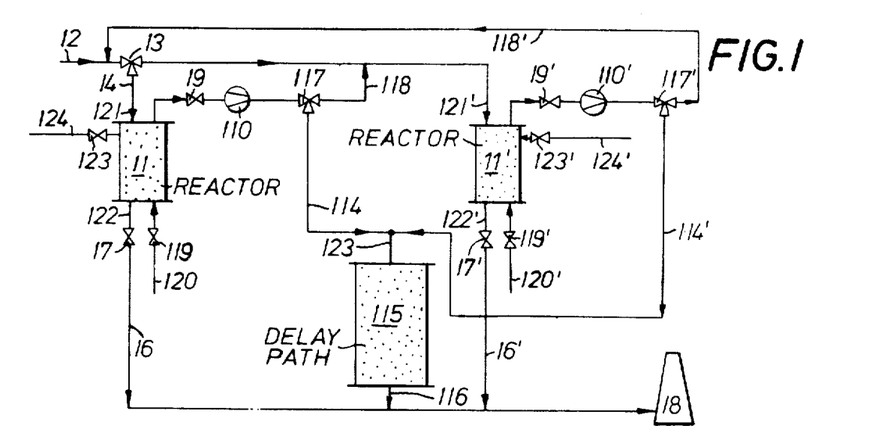
FIG. 1 is a schematic representation of an arrangement for practicing the method of the present invention where krypton and xenon are separated together from the waste gas.

Referring now to FIG. 1, there is shown a first embodiment of an arrangement according to the invention for the treatment of a stream of waste gases including krypton and xenon nuclides.

The arrangement shown in FIG. 1 basically includes two parallelly connected adsorption/desorption reactors 11, 11', an activated carbon delay path 115 and a respective rinsing arrangement associated with each adsorption/desorption reactor 11, 11'. In the illustrated embodiment the rinsing arrangement for the reactor 11 includes the series connection of normally closed valve 19, pump 110, three-way valve 117. It should be noted that since the connecting and rinsing arrangements of the two reactors 11, 11' are the same, similar numbers are used for the same parts associated with each of the reactors and only the reactor 11 and its operation will be described in detail.

The adsorption/desorption reactor 11, which is filled with activated carbon, is provided with an inlet 121 which is connected via a line 14 and a three-way valve 13 to the waste gas line 12 in which is flowing the waste gas to be treated and which contains krypton and xenon. The outlet 122 of the reactor 11 is connected via a normally open valve 17 and a poor gas discharge line 16 to a chimney 18 for discharge into the atmosphere.

In operation, the valve 13 is positioned so that the waste gas stream in waste gas line 12 is directed into the inlet 121 of reactor 11. This flow of waste gas through reactor 11, wherein krypton and xenon is adsorped on the activated carbon, is continued until krypton breaks through or appears at the outlet 122. Due to the properties of krypton and xenon, the breakthrough of xenon would occur much later. The partial gas stream exiting from reactor 11 prior to the occurrence of the krypton breakthrough contains neither krypton nor xenon, i.e., it is a poor gas fraction, and is thus discharge directly to chimney 18 and thus to the atmosphere via valve 17 and poor gas line 16.

UPon reaching the krypton breakthrough, the valve 13 is switched so that the stream of waste gas in gas line 12 is conducted through the second, parallelly connected adsorption/desorption reactor 11' wherein a similar adsorption cycle is initiated. After the switching of the valve 13, activated carbon in the adsorption/desorption reactor 11 is regenerated in order that it be ready for a subsequent adsorption cycle and to provide a second partial stream which is rich in the radioactive contaminants, i.e., the rich gas fraction.

In order to regenerate the active carbon of the reactor 11, the valve 17 is closed, the valve 19 is opened and the valve 117 is initially positioned to connect the output of pump 110 to the waste gas line 12 via gas line 118. The pump 110 then evacuates the reactor 11 in contercurrent flow until a pressure between 100 and 1 Torr is reached and the pumped-out gas, whose krypton and xenon concentration corresponds at an average to the starting concentration of the waste gas, is returned to the waste gas stream, and thus to the second adsorption/desorption reactor 11', via line 118 in which an intermediate store (not shown) may be provided if desired.

Figure 4:
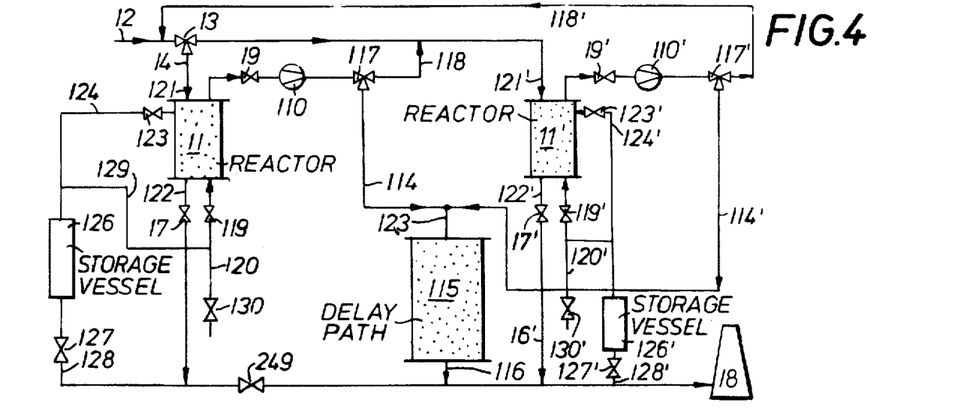
FIG. 4 is a schematic representation of an arrangement for practicing the method of the present invention according to FIG. 1 and where the poor gas fraction is utilized after intermediate storage in a storage vessel for the regeneration of the reactors as a rinsing and pressure equalization gas.

After the evacuation of the reactor is completed the reactor 11 is rinsed with an inactive gas in order to desorb the krypton and the xenon from the activated carbon. In the illustrated example the inactive gas is fed through line 120 and valve 119 to the reactor 11. It is to be understood, that, for example, a portion of the poor gas fraction in the line 16 may be utilized for rinsing if desired. In such case however, the apparatus contained in the rinsing cycle arrangement would be slightly different (as illustrated in FIG. 4).

In order to rinse the reactor 11 with the inactive gas according to the illustrated embodiment of the invention, the valve 117 is positioned to connect the output of the pump 110 to the line 114. The pump 110 then pumps the rinsing gas fed through line 120 valve 119 through the reactor 11 - at a pressure of less than 760 Torr - through the reactor 11 so that the krypton and xenon which had been adsorbed on the activated carbon are desorbed. The direction of flow of the rinsing gas is here opposite to the direction of flow during the adsorption phase. The resulting gas stream, which is rich in krypton/xenon and constitutes the rich gas fraction, is conducted via line 114 to the inlet 123 of the activated carbon delay path 115 whose outlet is in communication with chimney 18 via line 116. Before entering chimney 18, the decontaminated gas leaving the delay path 115 is mixed with the poor gas fraction leaving the adsorption/desorption reactor 11 or 11'. At the completion of the regeneration process the valves 19 and 119 are closed, the valve 17 is opened and an inactive gas, is fed through line 4 and a normally closed valve 123 to the adsorption/desorption reactor 11 so that the original pressure present during the adsorption process is reestablished in the adsorption/desorption reactor 11. Upon completion of this process a new adsorption/desorption cycle can begin in the reactor 11.

The control of the valves in the above-described embodiment may be either manual or, in a manner well known in the art automatic. Additionally, the determination of the krypton breakthrough at the output of the respective reactors 11 and 11' may be determined by conventional analytic and monitoring techniques and with conventional instrumentation.

A monitoring techninique and instrumentation as it may be used to detect the krypton breakthrough in a slightly different arrangement is disclosed in "Kerntechnik" 13(1971)5, page 209. A particularly large reduction in the waste gas quantity and thus a large decrease in the size of the delay path is realized if the rinsing gas for the enrichment stage is an easily condensible gas such as for example, water vapor, $CO_2$, $NH_3$ or freon, instead of air, and this condensible gas is condensed out of the rich gas fraction before it enters the activated carbon delay path.

Figure 2:
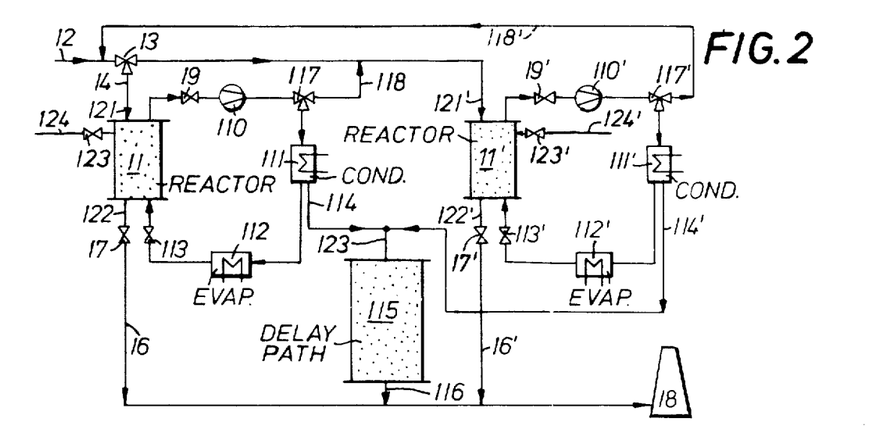
FIG. 2 is a schematic representation of an arrangement for practicing the method of the present invention where krypton and xenon are separated together from the waste gas and where a condensible gas is used as the rinsing gas.

In the arrangement shown in FIG. 2 an easily condensible gas, and in particular $CO_2$, which is supplied by the evaporator 112 is to be used as the rinsing gas.

In order to rinse the reactor 11 with the $CO_2$ according to the illustrated embodiment of the invention, the valve 113 is opened and the valve 117 is positioned to connect the output of the pump 110 to the condenser 111. The pump 110 then pumps the $CO_2$ rinsing gas produced in evaporator 112 - at a pressure of less than 760 Torr - through the reactor 11 so that the krypton and xenon which had been adsorbed on the activated carbon are desorbed. The direction of flow of the rinsing gas is here opposite to the direction of flow during the adsorption phase. In condenser 111, the $CO_2$ is condensed out of the rinsing gas stream and the resulting gas stream, which is rich in krypton/xenon and constitutes the rich gas fraction, is conducted via line 114 to the inlet 123 of the activated carbon delay path 115 whose outlet is in communication with chimney 18 via line 116. Before entering chimney 18, the decontaminated gas leaving the delay path 115 is mixed with the poor gas fraction leaving the adsorption/desorption reactor 11 or 11'. At the completion of the regeneration process the valves 19 and 113 are closed, the valve 17 is opened and an inactive gas, is fed through line 124 and a normally closed valve 123 to the adsorption/desorption reactor 11 so that the original pressure present during the adsorption process is reestablished in the adsorption/desorption reactor 11. Upon completion of this process a new adsorption/desorption cycle can begin in the reactor 11.

The control of the valves in the above-described embodiment may be either manual or, in a manner well know in the art automatic. Additionally, the determination of the krypton breakthrough at the output of the respective reactors 11 and 11' may be determined by conventional analytic and monitoring techniques and with conventional instrumentation as described in connection with FIG. 1.

It is sometimes necessary (and this method is practised with particular advantage) to modify the present invention so that the first gas fraction, i.e., the poor gas fraction, which is free from noble gases is not conducted directly from the enrichment stage, i.e., the adsorption/desorption reactor, into the atmosphere (FIG. 4). This is applicable particularly when, in addition to the noble fission gases, additional radioactive activation gases, particularly nitrogen and oxygen nuclides, are contained in the exhaust air. In this case, at least a portion of the first gas fraction can be stored in an intermediate storage vessel 126 and, during the regeneration of the enrichment stage, can be used for rinsing and for pressure equalization. In this case the poor gas is conducted by the line 16 and 128, valve 127 to the storage vessel 126. From the storage vessel 126 the poor gas is conducted for rinsing by line 129, line 120, valve 119 to the reactor 11, and for pressure equalization by line 124 and valve 123 to the reactor 11. Thus a small portion of this gas with its possible radioactive nitrogen and oxygen nuclides will also reach the delay path and will enter the atmosphere substantially later.

Figure 5:
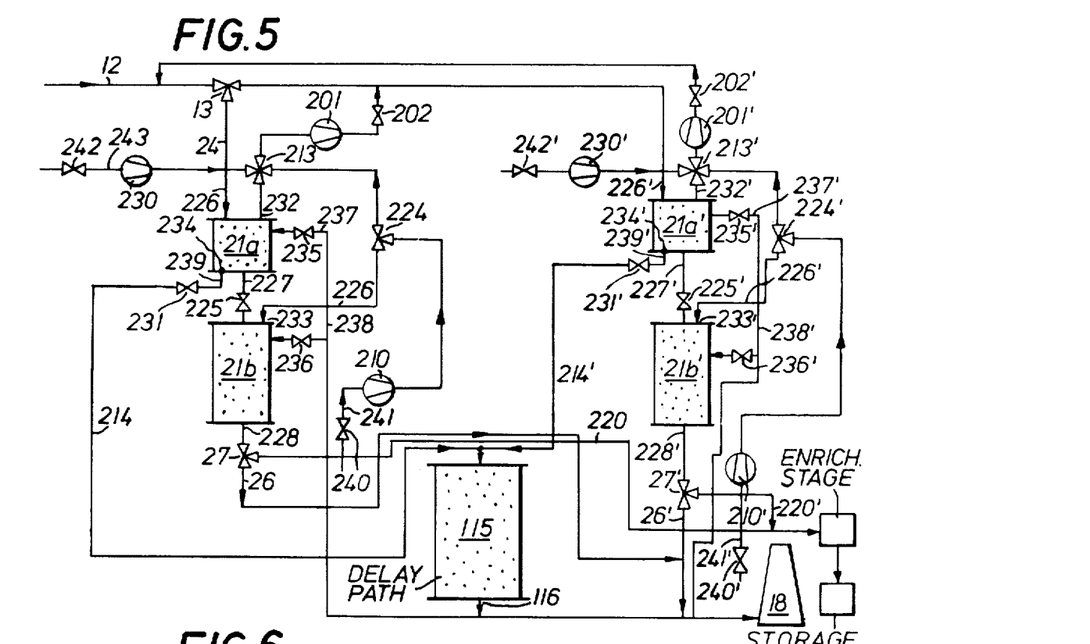
FIG. 5 is a schematic representation of an arrangement for practicing the method according to the present invention where krypton and xenon are individually separated from the waste gas.
Figure 6:
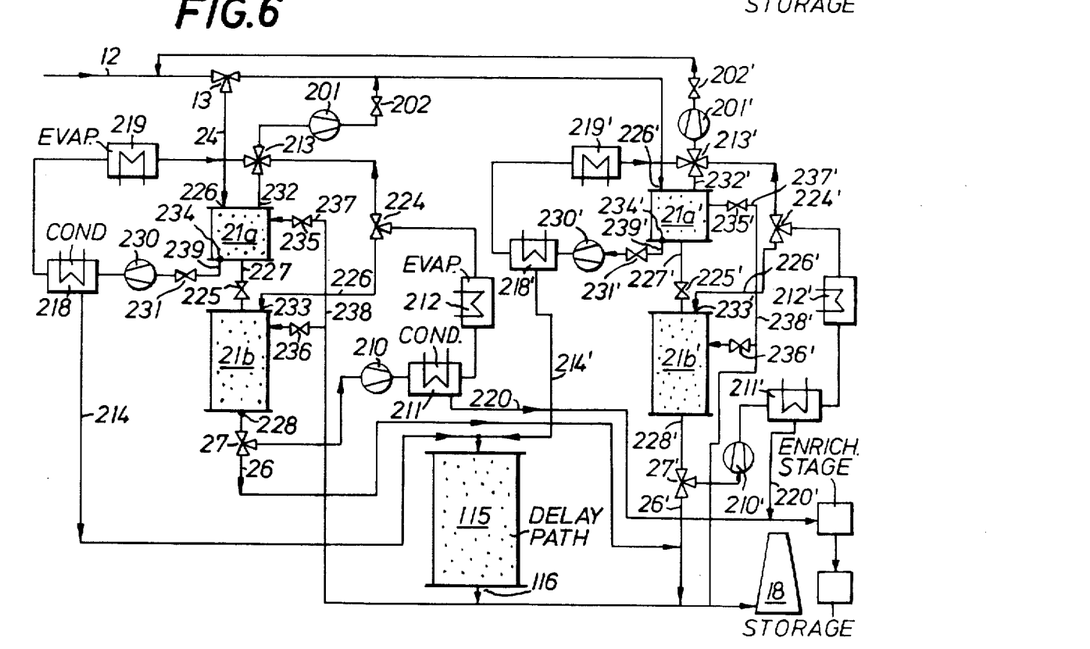
FIG. 6 is a schematic representation of an arrangement for practicing the method according to the present invention where krypton and xenon are individually separated from the waste gas and where a condensible gas is used as the rinsing gas.

If it is desired to separate the noble gases krypton and xenon from one another, then the embodiment of the invention illustrated in FIGS. 5 and 6 can be used.

The arrangements shown schematically in FIGS. 5 and 6 again include basically two parallelly connected adsorption/desorption reactor stages 21 and 21', an activated carbon delay path 115, and the respective rinsing cycle arrangements associated with the individual adsorption/desorption reactors. In contradistinction to the arrangement shown in FIGS. 1,2,3 and 4 each of the adsorption/desorption reactor stages is formed of two different-sized adsorption/desorption reactors 21a, 21b, and 21'a, 21'b, respectively, which are connected in series by means of a normally open valve 225 or 225', respectively. The reactors 21a and 21'a whose inlets 226 and 226', respectively, are connected to the waste gas line 12 are smaller than the respectively connected reactors 21b and 21'b.

These adsorption/desorption stages 21, 21' are, as with the embodiment of FIGS. 1,2,3 and 4 alternatingly fed with the waste gas to be decontaminated, which gas is flowing through waste gas line 12 in the indicated direction, by positioning of the valve 13. During the time that the waste gas stream is flowing through a particular adsorption/desorption reactor stage 21 or 21', and up until the breakthrough of the krypton at the outlet 228 or 228' of the reactor 21b or 21'b respectively, the respective three-way outlet valves 22 or 27' are positioned to conduct the exiting partial gas stream, i.e., the poor gas fraction, to the chimney 18. The individual reactors of an adsorption/desorption stage, e.g., the reactors 21a, 21b, of stage 21, are dimensioned, in a known manner, so that at the time when the krypton breaks through at the outlet 228 of reactor 21b, the xenon has still not as yet escaped at the outlet 227 of the first, smaller reactor 21a. After the krypton breakthrough, as in the embodiment of FIGS. 1,2,3 and 4 the valve 13 is repositioned and the activated carbon in the two adsorption/desorption reactors 21a, 21b of the first adsorption/desorption stage 21 is regenerated during the time in which the waste gas flows through the second, parallelly connected adsorption/desorption stage 21'.

In order to regenerate the activated carbon of reactor 21a and 21b an inactive rinsing gas is passed through the reactor so as to desorb the krypton and xenon. In the embodiment of FIG. 6, as in the embodiment of FIG. 2, an easily condensible rinsing gas, and in particular $CO_2$, is utilized, and consequently each of the rinsing cycle arrangements includes a condenser, e.g., 211 or 218, and an evaporator 212 or 219, for the rinsing gas. To initiate the regeneration cycle, after switching of valve 13, initially valve 27 is closed, valve 202 is opened and valve 213 is positioned to connect the inlet of pump 201 with inlet/outlet 232 of reactor 21a. Both adsorption/desorption reactors 21a, 21b are then evacuated, valve 225 remaining open, by pump 201 in countercurrent to a pressure which lies between 100 and 1 Torr and the pumped-out gas is returned to the stream of waste gas, as described in connection with FIGS. 1,2,3 and 4 via valve 202. Thereafter, valve 27 is positioned to connect the outlet 228 of reactor 21b to the inlet of pump 210, and valves 213 and 224 are positioned to connect the outlet of evaporator 212 to the inlet/outlet 232 of reactor 21a. Pump 210 then causes the rinsing gas produced in evaporator 212, i.e., the $CO_2$, to circulate at a pressure of less than 760 Torr through the reactors 21a, 21b so that the remaining krypton and xenon still adsorbed at the activated carbon in the two adsorption/desorption reactors 21a, 21b is desorbed. The direction of flow of the rinsing gas during this phase is the same as during the absorption phase. After a short period of time, for example, after a few minutes, when the krypton has been completely rinsed out of the smaller adsorption/desorption reactor 21a into the larger adsorption/desorption reactor 21b, and only a very small portion of the xenon has been rinsed from reactor 21a to reactor 21b, valve 225 is closed, the valve 213 is positioned to connect output of evaporator 219 to the inlet/outlet 232 of reactor 21a, the valve 224 is positioned to connect the evaporator 212 to inlet 233 of reactor 21b and the normally closed valve 231 connected to outlet 239 of reactor 21a is opened. The subsequent subatmospheric pressure rinsing is then effected in two separate rinsing cycles, one associated to each adsorption/desorption reactor 21a and 21b.

With the valves 213, 224 and 231 positioned as indicated, the adsorption/desorption reactor 21b continues to be rinsed by the gas produced by evaporator 212 and pumped by pump 210. The rinsing of reactor 21a, however, is effected by pump 230 which pumps the rinsing gas producing by evaporator 219. In the respective condensers 211 and 218 the $CO_2$ is condensed or frozen and the product gases krypton and xenon are extracted separately. The stream of krypton is conducted via line 220 to further enrichment stages, if desired, and finally to a long-term storage facility. The stream of xenon, however, with its relatively short-lived radionuclides is conducted through line 214 to the inlet of the activated carbon delay path 115.

Upon leaving the delay path 115 the decontaminated waste gas is further diluted before it enters the chimney 18 by mixing with the gas fraction or partial stream coming from the enrichment stages which is free from noble gases, i.e., the waste gas stream exiting from outlet 228 or 228' prior to the krypton breakthrough. In principle, a plurality of enrichment stages can be provided for the xenon. As soon as all of the krypton or xenon, respectively, has been desorbed from the activated carbon of the adsorption/desorption stage 21, the rinsing gas streams are interrupted by closing of valves 27, 213, 224 and 231 and an inactive gas corresponding to the major component in the gas to be decontaminated, and obtained from poor gas line 116, is introduced into the individual reactors 21a and 21b by opening normally closed valves 235 and 236 for a short period of time in order to reestablish the original pressure present during the adsorption process in the two adsorption/desorption reactors 21a and 21b. After opening of valves 27 and 225 a new adsorption/desorption cycle can begin by simply switching valve 13.

In the embodiment of FIG. 5 the rinsing gas utilized is not an easily condensible gas and consequently the condensors and evaporators are not utilized. Rather the inlet of pump 210 is connected to a source of inactive gas via a line 241 and a normally closed valve 240, the outlet of pump 210 is directly connected to valve 224 and one outlet of valve 27 is directly connected to the inlet of delay 115. Similarly the inlet of pump 230 is connected, via a normally closed valve 242 and a line 243 to a source of inactive rinsing gas, the outlet of pump 230 is directly connected to one inlet of valve 213, and valve 231 is directly connected via line 214 to the inlet of delay 115. The operation of this embodiment during the regeneration cycle, other than the recirculation of the rinsing carrier gas, is the same as that of FIG. 6.

Figure 7:
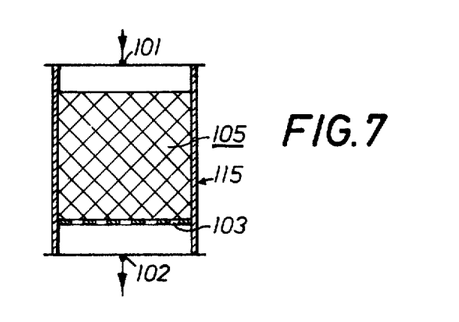
FIG. 7 shows a schematic representation of the carbon delay path.

The delay-path 115 shown in FIG. 7 in detail consists of a container 100 for the carbon 105. The container 100 is filled with heaped activated carbon 105 (rods approx. 5mm long and 4 mm dia.) to a required level. The diameter of the container 100 is contingent on a fixed current velocity of the rich gas fraction. This current velocity is important for a steady current in the delay path. The length of the container 100 then results from the volume of the carbon 105 which is fixed by the required delay (Examples 1 to 4).

A similar arrangement may be used for reactor 11, 11', 21 or 21' used for the enrichment.

FIG. 4 is a schematic representation of an arrangement for practicing the method of the invention similar to FIG. 1 but where the poor gas fraction is utilized - after intermediate storage in a storage vessel - for the regeneration of the reactors as a rinsing and pressure equalization gas.

In the illustrated embodiment the rinsing and the pressure equalization arrangement includes the series connection of normally closed valve 19, pump 110 and three-way valve 117 at the outlet for the pumped-out gas and the line 16, valve 17, line 128, valve 127, storage vessel 126, line 129, valve 119, line 124 and valve 123 at the inlets for the rinsing and pressure equalization gas.

In operation, the valve 13 is positioned so that the waste gas stream in waste gas line 12 is directed into the inlet 121 of reactor 11. This flow of waste gas through reactor 11, wherein krypton and xenon is adsorped on the activated carbon, is continued until krypton breaks through or appears at the outlet 122. Due to the properties of krypton and xenon, the breakthrough of xenon would occur much later. The partial gas stream exiting from reactor 11 prior to the occurrence of the krypton breakthrough contains neither krypton nor xenon, i.e., it is a poor gas fraction, and is conducted via valve 17, line 16, line 128 and valve 127 to the storage vessel 126.

Upon reaching the krypton breakthrough, the valve 13 is switched so that the stream of waste gas in gas line 12 is conducted through the second, parallelly connected adsorption/desorption reactor 11' wherein a similar adsorption cycle is initiated. After the switching of the valve 13, activated carbon in the Adsorption/-desorption reactor 11 is regenerated in order that it be ready for a subsequent adsorption cycle and to provide a second partial stream which is rich in the radioactive contaminants, i.e., the rich gas fraction.

In order to regenerate the active carbon of the reactor 11, the valve 17 is closed, the valve 19 and the valve 119 are opened and the valve 117 is initially positioned to connect the output of pump 110 to the waste gas line 12 via gas line 118. The pump 110 then evacuates the reactor 11 in contercurrent flow until the required pressure is reached and the pumpedout gas is returned to the waste gas stream, and thus to the second adsorption/desorption reactor 11', via line 118.

After the evacuation of the reactor is completed, the reactor 11 is rinsed with the rinsing gas stored in the storing-vessel 126. In the illustrated example the rinsing-gas is conducted via line 129 and valve 119 to the reactor 11.

The valve 117 is positioned to connect the output of the pump 110 to the line 114. The direction of flow of the rinsing gas is here opposite to the direction of flow during the adsorption phase. The resulting gas stream, which is rich in krypton/xenon and constitutes the rich gas fraction, is conducted via line 114 to the inlet 123 of the activated carbon delay path 115 whose outlet is in communication with chimney 18 via line 116.

At the completion of the regeneration process the valve 19 and 119 are closed, the valve 17 is opened and the inactive gas, stored in the storage vessel 126, is fed through line 124 and a normally closed valve 123 to the adsorption/desorption reactor 11 so that the original pressure present during the adsorption process is reestablished in the adsorption/desorption reactor 11. Upon completion of this process a new adsorption/-desorption cycle can begin in the reactor 11.

If it is desired to use an inactive gas other than the poor gas fraction for the rinsing and/or pressure equalization gas, then the valve 127 is closed and the valve 132 opened at the appropriate time in the regeneration cycle. The valve 249 in the gas line 116 is utilized to regulate the quantity of the poor gas fraction which can flow into storage vessel 126 via valve 127.

In order to further explain the present invention and the advantages connected therewith, a few examples are set forth below.

Example 1

During the operation of a nuclear power plant $38m_n^3$ of waste gas per hour are produced. The operating pressure is 760 Torr and the temperature is 21°C. A delay time of 3 days is required for krypton and a delay time of 48 days is required for xenon prior to release into the atmosphere. The waste gas is initially conducted through a single-stage noble gas enrichment system which includes three activated carbon reactors, each containing $1.0m^3$ of activated carbon, which are operated alternatingly at 20-minute intervals. The waste gas (= poor gas) which is cleansed of noble gases in the respective adsorption phase of the enrichment system is pressed, on its way to the chimney, for its major portion into an intermediate storage vessel from where it is used during the next regeneration phase of the enrichment system to rinse the activated carbon charged with the noble gases as well as for pressure equalization. For the rinsing process, which takes about 40 minutes per reactor, approximately $5m_n^3$ of decontaminated waste gas are required for the subsequent pressure equalization in the reactor about $4.5m_n^3$ of decontaminated waste gas are required. The rinsing gas with the gas rich in noble gases desorbed from the activated carbon, which together constitutes the product gas (= rich gas fraction) of the enrichment system, is subsequently conducted through an activated carbon delay column or path. The delay path is designed to handle a waste gas quantity of about $15m_n^3$ per hour at 1 atmosphere absolute. The activated carbon volume in the delay path is calculated according to equation (1) as follows:

$$V = \frac{t_R \cdot w}{R} = \frac{48 \cdot 24 \cdot 15}{378} = 45.8 m^3$$

if a retention factor of 378 is used for xenon and a retention factor of 23.6 for krypton. The activated carbon volume of the total system is consequently $(45.8 + 3 \cdot 1.0) = 48.8 m^3$.

If under the same operating conditions a delay path without the enrichment stage ahead of it were used in the conventional manner, the larger activated carbon volume of $$V = \frac{48 \cdot 24 \cdot 38}{378} = 116 m^3$$

would result from equation (1).

Example 2

A delay path with an enrichment stage connected ahead of it as described in Example 1 is again utilized under the same conditions except that during the rinsing process the activated carbon reactor of the enrichment stage is heated to about 60°C. With this increase in temperature the quantity of rinsing gas can be reduced until the subsequent delay path contains only about $32m^3$ of activated carbon volume.

Example 3

In a modification of the process described in Example 1, the enrichment stage is operated at a constant temperature of −5°C and $CO_2$ is used as the rinsing gas which is almost completely frozen out before entry into the delay path. The enrichment system includes three activated carbon reactors operated alternatingly at intervals of 20 minutes and each having an activated carbon volume of about $0.6m^3$. The quantity of gas entering the delay path operated at normal temperature is $3.0m_n^3$ per hour. The volume of the delay path is thus calculated to be $$V = \frac{t_R \cdot w}{R} = \frac{48 \cdot 24 \cdot 3.0}{378} = 9.2 m^3$$

(designed for xenon).

The activated carbon volume of the entire system is then $(9.2 + 3 \cdot 0.6) = 11.0 m^3$. Compared to a conventional delay system without an enrichment stage connected ahead of it this means a decrease in volume by about the factor 0.1.

Example 4

The process described in Example 3 is modified to the extent that an enrichment stage as shown in FIG. 6 is utilized so that the krypton and the xenon are separated from one another. The krypton is further concentrated in further enrichment stages in order to be able to subsequently store it for many years. The gas rich in xenon from the first enrichment stage is conducted into a delay path as shown in FIG. 6. Because of the krypton/xenon separation, the quantity of waste gas to be conducted through the delay path is again reduced by about the factor 0.1 after the rinsing gas has been condensed out. The activated carbon volume in the delay path is reduced correspondingly and, designed for the xenon, it is now:

$$V = \frac{t_R \cdot w}{R} = \frac{48 \cdot 24 \cdot 0.38}{378} = 1.16 m^3$$

The volume of the entire enrichment system depends on the degree of concentration of the krypton. The enclosed area for the enrichment system in the present case will generally be somewhat larger than the area required for the xenon delay path.

In all above-described embodiments of the present invention the gas (and with the dual rinsing of FIGS. 5 and 6, part of the gas) produced during the rinsing process in the enrichment stage, is conducted directly into the delay path. The present invention, however, can also be extended to an arrangement where this rinsing gas is once more or even several times more returned to the contaminated waste gas stream. In the same manner as the gas produced during the evacuation of the adsorbers of the enrichment stage (see in this connection FIG. 1, for example), the rinsing gas fraction of each adsorber in the enrichment stage presently connected to perform the regeneration process is also returned to the starting gas stream in line 12 and thus reaches the adsorber in the enrichment stage which is presently set to perform the adsorption process. This process can be repeated several times so that the entire quantity of gas produced during the regeneration phases circulates in the enrichment stages for a time and only the decontaminated waste gas is discharged directly into the atmosphere as in the previous embodiments.

The individual adsorbers of the reactors must then, of course, be designed to be larger to correspond to the gas through-put which has been increased by the rinsing gas. The throughput of rinsing gas in this case is not higher, however, than in the above examples. Although, with this arrangement, the noble gas concentration in the enrichment state will continuously become higher during the cyclic passage through the individual adsorbers, it has been found, however, that complete regeneration of the individual adsorbers can be effected without increasing the quantities of rinsing gas and the rinsing times within the range of low concentrations. This applies at least until such time as the time required for breakthrough of the noble gases at the output of the adsorption/desorption reactor drops to such a point, due to the higher noble gas concentrations, that krypton (which breaks through before xenon) passes into the decontaminated waste gas in undue quantities during the adsorption phase of the individual adsorbers. With the appropriate design of the adsorbers it can be made possible, however, that this time will occur relatively late, for example after the desorption gas which becomes richer in krypton and xenon has passed through the enrichment stage more than five to ten times at normal temperature. Only then will it be necessary to conduct the desorption gas of the individual adsorbers to a delay path in succession, possible via an intermediate storage.

Sometimes it is also advantageous to remove a small partial stream from the desorption gas which continuously circulates in the enrichment stage and to conduct it through the delay path. The quantities of gas processed therein are usually so small because of the cyclic process employed in the enrichment stage, that the delay path and the enrichment stage occupy about the same area in order of magnitude. At the end of the delay path, the gas released from the delay path is mixed with the decontaminated gas from the enrichment stage, as described above.

The process according to the present invention can principally also be used for the decontamination of radioactive gas mixtures other than those used in the description of the drawings and listed in the Examples. For example, in addition to krypton and xenon, the method of the invention can be applied for argon, nitrogen, oxygen, hydrogen, etc. in air, helium, carbon dioxide and others.

The present invention is of particular importance for the decontamination of waste gases from the operation of water-cooled nuclear reactors where the gas which is rich in radioactive components is produced in the turbine condenser. Since in this condenser a subatmospheric pressure between about 10 and 100 Torr must be continuously maintained, it is advisable to directly utilize this condenser pressure for the evacuation and rinsing, of the reactors.

Figure 3:
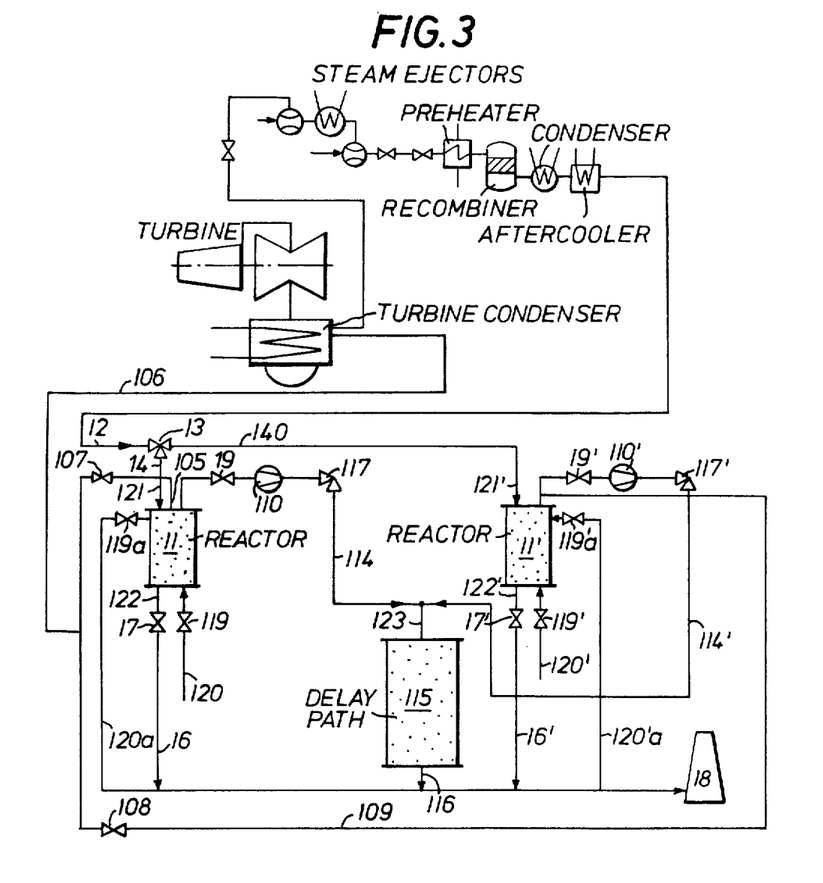
FIG. 3 is a schematic representation of an arrangement practicing the method of the present invention where the subatmospheric pressure in a turbine condenser is utilized for the evacuation and rinsing of the reactors.

A schematic representation of an arrangement for practicing the method of the present invention where the subatmospheric pressure in a turbine condenser is utilized for the evacuation of the reactors is shown in FIG. 3.

In order to regenerate the active carbon of the reactor 11, the valve 17 is closed and the valve 107 is opened. The subatmospheric pressure in the turbine condenser then evacuates (via lines 105 and 106) the reactor 11 in countercurrent flow until the required pressure is reached and the pumped-out gas is returned via the turbine condenser to the waste gas stream, and thus to the second adsorption/desorption reactor 11', via line 140 in which an intermediate store (not shown) may be provided if desired. After the evacuation of the reactor is completed the reactor 11 is rinsed with an inactive gas as described.

It will be understood that the above description of the present invention is susceptible to various modifications, changes and adaptations, and the same are intended to be comprehended within the meaning and range of equivalents of the appended claims.

We claim:

1. A method of treating waste gases containing radioactive contamination by adsorption in an activated carbon delay path whose output gas stream is discharged to the atmosphere, comprising the steps of: initially passing the waste gas steam to be decontaminated through an adsorptive enrichment system until the first active component of the waste gas breaks through in unpermissible concentration at the outlet of the enrichment system, the gas fraction having been discharged from the enrichment system up to this point being substantially free from the radioactive impurities and constituting the poor gas fraction ; discharging the poor gas fraction at least in part into the atmosphere; after the breakthrough, regenerating the enrichment system by rinsing same with an inactive rinsing gas to desorb the active components, the then discharged desorption gas fraction constituting a rich gas fraction; and conducting only said rich gas fraction obtained by rinsing said enrichment system through the activated carbon delay path.

2. A method as defined in claim 1 wherein said step of initially passing comprises conducting the waste gas stream at atmospheric pressure, and in a first direction, through a first adsorption/desorption reactor filled with activated carbon until the first active component of the waste gas breaks through in unpermissible concentration at the outlet of the reactor, the partial gas stream having been discharged from the reactor up to this point constituting said poor gas fraction, and after the breakthrough, feeding the contaminated waste gas stream to a similar second adsorption/desorption reactor; and wherein said step of regenerating is carried out on the first adsorption/desorption reactor and includes: pumping out the first reactor and returning the pumped out gas fraction to the stream of contaminated waste gas, and thereafter rinsing the reactor with an inactive rinsing gas flowing through the reactor in a direction opposite to said first direction at a subatmospheric pressure to desorb the active components from the reactors, the then discharged desorption gas fraction constituting the rich gas fraction; and then returning the adsorption/desorption reactor to atmospheric pressure by introducing an inactive gas thereto.

3. A method as defined in claim 2 wherein the reactor is maintained at a constant temperature during the adsorption and during the rinsing or desorption phases.

4. A method as defined in claim 2 wherein the temperature of the reactor is raised up to a maximum temperature of 150°C during the desorption phase.

5. A method as defined in claim 2 wherein the desorption gas fraction is conducted directly into said activated carbon delay path at substantially the same pressure used during the rinsing phase.

6. A method as defined in claim 2 wherein the desorption gas fraction is conducted directly into said delay path at a pressure which is slightly higher than that used during the rinsing phase.

7. A method as defined in claim 2 wherein said step of conducting includes: returning said desorption gas fraction produced during said step of rinsing in the first adsorption/desorption reactor at least in part to the contaminated waste gas stream for introduction into the second similar adsorption/desorption reactor; continuing this process of returning the desorption gas fraction to the contaminated waste gas stream until the first active component of the waste gas breaks through at the outlet of the adsorption/desorption reactors in undue concentration during the adsorption phase; and only thereafter introducing the desorption gas fractions produced during pumping out and rinsing into the activated carbon delay path as rich gas.

8. A method as defined in claim 1 wherein said step of initially passing the waste gas stream to be decontaminated through an adsorptive enrichment system includes separating the active components from one another to provide at least two partial streams, each of which is a rich gas fraction containing one of said active components.

9. A method as defined in claim 8 wherein said active components are krypton and xenon nuclides and further comprising introducing the gas fraction rich in krypton to a further enrichment stage and then conducting the enriched krypton gas fraction to a long time storage location, and conducting the gas fraction rich in xenon to the activated carbon delay path.

10. A method as defined in claim 9 wherein said step of initially passing comprises introducing the waste gas stream at atmospheric pressure and in a first direction into a first adsorption/desorption stage including a pair of series connected adsorption/desorption reactors which are filled with activated carbon with the one of the pair of reactors into which the waste gas stream is initially introduced being smaller than the other of the pair of reactors with the relative sizes being such that the xenon will not have broken through at the outlet of the smaller reactor when the krypton has broken through at the outlet of the larger reactor, and after the breakthrough of the krypton at the outlet of the larger reactor, feeding the contaminated waste gas stream to a similar further adsorption/desorption stage; and wherein said step of regenerating is carried out on the first adsorption/desorption stage and includes: pumping out the two series connected adsorption/desorption reactors in a direction opposite said first direction and returning the pumped out gas fraction to the stream of waste gas; thereafter rinsing both of said pair of adsorption/desorption reactors with a steam of an inactive rinsing gas at subatmospheric pressure flowing in said first direction until the krypton has been competely desorbed and rinsed from the smaller to the larger adsorption/desorption reactor but the xenon has been rinsed over from the smaller to the larger adsorption/desorption reactor only to a negligibly small extent; subsequently separately rinsing each of the smaller and larger adsorption/desorption reactors with a separate stream of an inactive rinsing gas at subatmospheric pressure and flowing in a direction opposite said first direction to provide two separate gas fractions which are enriched with xenon or with krypton respectively; and, after rinsing returning both of the adsorption/desorption reactors to atmospheric pressure by introducing the inactive gas thereto.

11. A method as defined in claim 10 wherein the reactor stage is maintained at a constant temperature during the adsorption and during the rinsing or desorption phases.

12. A method as defined in claim 10 wherein the temperature of the reactor stage is raised up to a maximum temperature of 150°C during the desorption phase.

13. A method as defined in claim 2 wherein said poor gas fraction is used in part, after intermediate storage in a storage vessel, for the regeneration of the reactors as a rinsing and pressure equalization gas.

14. A method as defined in claim 2 wherein said inactive rinsing gas is an easily condensible gas; and further comprising separating said easily condensible gas from the desorption fraction prior to conducting same into the activated carbon delay path and then recirculating the rinsing gas.

15. A method as defined in claim 14 wherein said rinsing gas is selected from the group consisting of $CO_2$, water vapor, freon and ammonia.

16. Apparatus for treating waste gases containing radioactive contamination, particularly krypton and xenon nuclides, by adsorption in an activated carbon delay path whose output gas stream is discharged to the atmosphere comprising in combination:
a feed line for the stream of contaminated waste gas;
an activated carbon delay path whose outlet is connected with a waste gas chimney for discharge to the atmosphere;
at least two adsorption/desorption reactors each of which is filled with activated carbon and each provided with a waste gas inlet, a poor gas outlet, a rich gas outlet and a rinsing gas inlet;
a first valve means for alternately connecting said waste gas inlets of said reactors to said feed line;
a respective normally open valve means for connecting the respective poor gas outlet of said reactor to said outlet of said delay path;
means for closing said second valve means and switching said first valve means when the first active component of the waste gas stream breaks through at the poor gas outlet of the respective reactor; and
means for regenerating the respective reactor in a plurality of phases during the time the waste gas is being fed to the other of said reactors, said means for regenerating including: first means for pumping out said reactor at subatmospheric pressure and for returning the pumped out gas fraction to said feed line during a first regeneration phase, and for rinsing said reactor at subatmospheric pressure with an inactive rinsing gas introduced into said reactor via said rinsing gas inlet and for feeding the rich gas fraction rinsed from said reactor to the inlet of said activated carbon delay path during a second regeneration phase; and second means, for introducing an inactive gas into said reactor to return same to the normal operating pressure.

17. The apparatus as defined in claim 16 wherein said inactive rinsing gas is an easily condensible gas and wherein said first means includes a series connection of: a first valve connected to said rich gas outlet; a pump connected between said first valve and the inlet of a three-way valve having a first outlet connected to said feed line and a second outlet; a condenser connected to said second outlet of said three-way valve; an evaporator having its inlet connected to the condensate outlet of said condenser and its outlet connected via a further valve to the rinsing gas inlet of said reactor; and a gas line connecting the gas outlet of said condenser with the inlet of said activated carbon delay path.

18. The apparatus as defined in claim 16 wherein said waste gas stream originates in the turbine condenser of a water cooled nuclear power plant, and wherein the subatmospheric pressure in said turbine condenser is utilized for the evacuation and rinsing of said reactors.

19. Apparatus for treating waste gases containing radioactive contamination, particularly krypton and xenon nuclides by adsorption in an activated carbon delay path whose output gas stream is discharged to the atmosphere comprising in combination:
a feed line for the stream of contaminated waste gas;
an activated carbon delay path whose outlet is connected with a waste gas chimney for discharge to the atmosphere;
at least two adsorption/desorption reactor stages, each of said adsorption/desorption reactor stages including first and second adsorption/desorption reactors which are each filled with activated carbon and are connected in series via a normally open valve, said first reactor being smaller than said second reactor and having a size relative thereto so that during passage of the waste gas through the reactor stage, the xenon will not as yet have broken through at the gas outlet of the first adsorption/desorption reactor when the krypton breaks through at the gas outlet of the second adsorption/desorption reactor;

a first valve means for alternately connecting the waste gas inlets of said first reactors of said reactor stages to said feed line;

a respective second valve means for normally connecting the respective poor gas outlets of said second reactor to said outlet of said delay path;

means for switching said first and second valve means when the first active component of the waste gas stream breaks through at the poor gas outlet of the respective said second reactor; and means for regenerating the respective first and second reactor during the time the waste gas is being fed to the other of said reactor stages, said means for regenerating including: first means, connected to the said rich gas outlet, for pumping out said first and second reactors at subatmospheric pressure and for returning the pumped out gas fraction to said feed line; second means for introducing a stream of inactive gas at subatmospheric pressure into said series first and second reactors via said waste gas inlet of said first reactor to rinse the krypton from said first reactor into said second reactor; third means for separately rinsing each of said reactors at subatmospheric pressure with a respective stream of inactive gas to provide first and second desorption product streams which are rich in xenon and krypton respectively and for feeding said stream rich in xenon to the inlet of said activated carbon delay path; and fourth means for introducing an inactive gas at atmospheric pressure into said first and second reactors to return same to normal operating pressure.

20. The apparatus as defined in claim 19 wherein said second valve means is a three-way valve having its inlet connected to said poor gas outlet of said second reactor, a first outlet connected to the outlet of said delay path and a second outlet; and wherein said means for regenerating comprises: a pump having its inlet connected to said second outlet of said second valve means; the series connection of a rinsing gas condenser and a rinsing gas evaporator connected between the outlet of said pump and the inlet of a second three-way valve; said second three-way valve having one outlet connected to a further inlet of said second reactor and a second outlet connected to one inlet of a four-way valve; said four-way valve having one outlet connected to a further inlet of said first reactor, a second outlet connected to said feed line via a second pump and a normally closed valve, and its second inlet connected to the outlet of a second rinsing gas evaporator for the rinsing gas for said first reactor; a third pump connected via a normally closed valve to a rich gas fraction outlet of said first reactor; and a second rinsing gas condenser having its inlet connected to the outlet of said third pump, its condensate outlet connected to the inlet of said second rinsing gas evaporator, and its gas outlet connected to the inlet of said activated carbon delay path.

* * * * *

UNITED STATES PATENT AND TRADEMARK OFFICE
CERTIFICATE OF CORRECTION

PATENT NO. : 3,963,460
DATED : June 15th, 1976
INVENTOR(S) : Willy Stumpf et al

It is certified that error appears in the above–identified patent and that said Letters Patent are hereby corrected as shown below:

In the heading of the patent, under [22] Filed, change "1976" to --1974--.

Signed and Sealed this

Thirty-first Day of August 1976

[SEAL]

Attest:

RUTH C. MASON
Attesting Officer

C. MARSHALL DANN
Commissioner of Patents and Trademarks